Patented Oct. 22, 1946

2,409,754

UNITED STATES PATENT OFFICE 2,409,754

METHOD FOR OBTAINING HYDANTOINS

Henry R. Henze, Austin, Tex., assignor to Parke, Davis & Company, Detroit, Mich., a corporation of Michigan No Drawing. Application September 9, 1940, Serial No. 356,107

14 Claims. (Cl. 260—309.5)

This invention relates to a method for obtaining hydantoins from ketones and more particularly to the preparation of 5,5-diarylhydantoins from diaryl ketones.

An object of this invention is the preparation of diarylhydantoins from diaryl ketones according to a new and novel method.

Other objects of this invention will be apparent on perusal of the specification and the appended claims.

Hitherto diarylhydantoins have been prepared from derivatives of benzil and similar compounds. However, no method has been available for the preparation of 5,5-diarylhydantoins from the corresponding diaryl ketones, despite the fact that such ketones are frequently more readily available than the corresponding benzil derivatives.

I have found that 5,5-diarylhydantoins can be prepared from diaryl ketones by heating the latter, in the presence of a solvent at least partly miscible with water, with a water-soluble cyanide and ammonium carbonate or an equivalent substance capable of yielding ammonia and carbon dioxide under the conditions of reaction. The reaction mixture thus obtained is treated so as to remove any unreacted diaryl ketone and then the hydantoin is isolated, for example, by acidifying the alkaline solution.

The reaction may be illustrated as follows for the case of the preparation of 5,5-diphenylhydantoin:

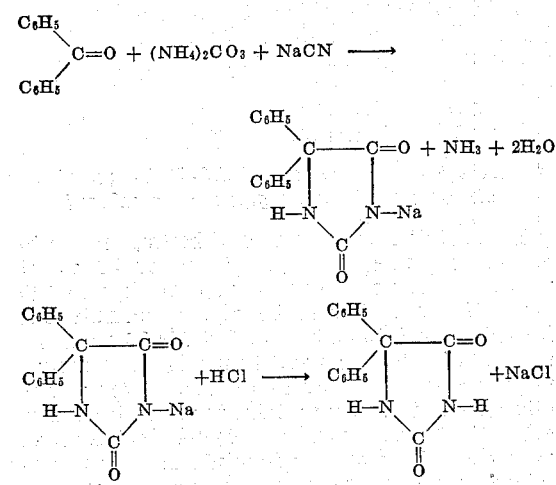

I have also found that the conditions of reaction required for the formation of diarylhydantoins from diaryl ketones determine the yield which may be obtained. In general, the operating temperature should be maintained within the range of 50–150° C. and the time required for reaction proportionately varied from at least 20 hours for the lower temperatures to at least 1 hour for the higher temperatures, although longer times of heating are in general helpful. At the lower temperatures longer times of heating are required to obtain the same gross yield that may be obtained at higher temperatures with shorter reaction times. For example, while at least 20 hours of heating at 55° is necessary to get a substantial yield, the same yield can be obtained at 110° by only a few hours of heating in a closed vessel so as to retain the volatile components.

In general, the diaryl ketone is not completely converted into the diarylhydantoin. The yield of diarylhydantoin calculated on the basis of the amount of diaryl ketone originally introduced into the reaction mixture is termed the gross yield while the yield of diarylhydantoin calculated on the basis of the amount of diaryl ketone actually used up, i. e. the difference between the amount of diaryl ketone originally introduced and the amount recovered, is termed the net yield. While the gross yield is considerably diminished by operating at lower temperatures and for shorter times of heating, the net yield is good under all conditions within the range indicated.

*Example 1.—Preparation of 5,5-diphenyl-hydantoin*

10 g. of benzophenone (1 mol), 4 g. of potassium cyanide (1.22 mols) and 16 g. of ammonium carbonate (3.3 mols) are dissolved in 100 cc. of 60% (by volume) ethyl alcohol and the mixture warmed under a reflux condenser without stirring at 58–62° C. After warming the mixture for 10 hours a partial vacuum is applied and the temperature is raised enough to permit concentration of the reaction mixture to two-thirds of its initial volume. A slight excess of mineral acid, such as sulfuric or hydrochloric acid is added to acidify the mixture which is then chilled and the solid which separates is filtered off. It is then treated with an aqueous solution of dilute sodium hydroxide to dissolve the hydantoin from the solid unreacted benzophenone. After filtration, the alkaline extract is then acidified to cause the separation of solid pure diphenylhydantoin which is filtered off and dried. It melts at 293–6° C.

A net yield of about 95% is obtained by the procedure described in this example. If the time of warming the reaction mixture is increased three- or four-fold, practically 100% net yields are obtained. The same high net yields are also obtained by heating for longer periods of time. For example, by heating for 90 hours, a 100% net yield, or 67% gross yield, is obtained.

The effect of the time of heating on the gross and net yield may be illustrated by the following table giving yields of diphenylhydantoin obtained by heating 10 grams of benzophenone, 4 grams of potassium cyanide and 16 grams of ammonium carbonate in 100 cc. of 60% ethanol at 58–62° C. for different periods of time:

| Time, hrs. | Hydantoin gross yield | Net yield |
|---|---|---|
| | Per cent | Per cent |
| 10 | 7 | 80–95 |
| 20 | 16 | 95+ |
| 30 | 33 | |
| 40 | 43 | |
| 50 | 54 | |
| 60 | 60 | 100 |
| 70 | 64 | |
| 80 | 66 | |
| 90 | 67 | |

Instead of working up the reaction mixture as described above, the reaction mixture may be rendered somewhat more alkaline and then any unreacted benzophenone removed by extraction with a water-immiscible organic solvent such as benzene, ether, or the like. Then the alkaline layer may be acidified to precipitate the diarylhydantoin which may be purified by recrystallization, as for example from alcohol.

*Example 2.—Preparation of 5-phenyl-5-(p-bromophenyl-)-hydantoin*

26 g. of p-bromobenzophenone is dissolved in 125 g. of fused acetamide and then 28 g. of ammonium carbonate and 9 g. of potassium cyanide are added. The mixture is heated in a steel container at 110° C. for 6 hours. While still liquid, the contents of the bomb are diluted with water and acidified with hydrochloric acid. The precipitated crude 5-phenyl-5-(p-bromophenyl-)-hydantoin is collected and purified as in Example 1. The melting point is 239° C. and the yield is 28 g. (85.2% net yield).

*Example 3.—Preparation of 5-phenyl-5-(p-chlorophenyl-)-hydantoin*

A mixture of 21.6 g. of p-chlorobenzophenone, 125 g. acetamide, 28 g. of ammonium carbonate and 9 g. of potassium cyanide is heated in a bomb for 4 hours at 110° C. While still hot, the reaction mixture is diluted with water and then cooled. The solution is acidified, the precipitated crude 5-phenyl-5-(p-chlorophenyl-)-hydantoin is collected and purified as in Example 1. The yield of this product, melting point 243° C. is 27 g.

*Example 4.—Preparation of 5,5-di-(p-dimethylaminophenyl-)-hydantoin*

To 115 g. of fused acetamide is added 18 g. of Michler's ketone (bis-p,p'-(dimethylamino)-benzophenone) 6.5 g. of potassium cyanide and 21 g. of ammonium carbonate. The mixture is heated at 140° C. for 14 hours. Then 150 cc. of water is added and the solution extracted with benzene. The alkaline layer is carefully neutralized with acetic acid and the precipitated 5,5-di-(p-dimethylaminophenyl-)-hydantoin collected and dried. The yield of product melting point 276–280° C. is 6 g.

*Example 5.—Preparation of 5,5-diphenylhydantoin*

15 g. of benzophenone, 4.5 g. of sodium cyanide and 24 g. of ammonium carbonate in 150 cc. of 60% (by volume) ethyl alcohol are placed in an autoclave and the mixture heated at 110° C. for 48 hours. At the end of this period the mixture is treated as described above under Example 1 to obtain the pure 5,5-diphenylhydantoin. The gross yield amounts to 75% and the net yield is practically quantitative. Sodium cyanide can be used at the higher temperatures but potassium cyanide is preferred in the lower temperature range. In general, the gross yields are improved by operating at the higher temperatures.

*Example 6.—Preparation of 5-(diphenylene-)-hydantoin*

A mixture of 3.45 g. of fluorenone, 1.38 g. of potassium cyanide, 6.7 g. of ammonium carbonate and 200 cc. of 50% alcohol is warmed for 30 hours at 59–60° C. The mixture is concentrated to 50 cc. and acidified. The precipitate is separated, leached with alkali and the alkaline extracts acidified and the pure 5-(diphenylene-)-hydantoin collected. After drying, it is recrystallized from dioxane-water and then has a melting point of 324–325° C. In this manner there is obtained 1.5 g. of the hydantoin, and 1.1 g. of fluorenone is recovered unchanged.

*Example 7.—Preparation of 5-(diphenylene-)-hydantoin*

A mixture of 25 g. of fluorenone, 12 g. of potassium cyanide, 50 g. of ammonium carbonate and 100 cc. of 80% alcohol is heated in a bomb at 110° C. for 24 hours. At the end of this time the solution is concentrated somewhat and then the solution is acidified. The precipitate is leached with sodium hydroxide solution and the alkaline extract acidified. The precipitated 5-(diphenylene-)-hydantoin is collected and recrystallized from dioxane-water. The yield is 66–78% of the hydantoin, melting point 324–325° C.

*Example 8.—Preparation of 5-(diphenylene-)-hydantoin*

18 grams of fluorenone is dissolved in 100 grams of fused acetamide. Then 9 grams of potassium cyanide and 28.8 grams of ammonium carbonate are added and the mixture heated in a steel bomb at 110° C. for 10 hours. The reaction mixture is diluted with 150 cc. of water, and then the mixture is acidified with hydrochloric acid and the precipitated solid collected. The yield of diphenylenehydantoin of melting point 324° C. is 21.5 grams (86% gross yield).

*Example 9.—Preparation of 5,5-diphenylhydantoin using propylene glycol as a solvent*

To a solution of 91 grams of benzophenone in 500 cc. of propylene glycol is added 50 cc. of water, 45 grams of potassium cyanide and 145 grams of ammonium carbonate. The mixture is heated in a steel bomb at 110° C. for 6 hours. At the end of this time the mixture is concentrated under reduced pressure to a paste. This paste is diluted with water and acidified with hydrochloric acid. The precipitate is collected and leached with 5% sodium hydroxide solution. The undissolved ketone is separated and the alkaline solution acidified with dilute hydrochloric acid. The precipitated 5,5-diphenyl-hydantoin is collected and dried. Thus there is obtained a 91% gross yield of the hydantoin; since about 6 grams of benzophenone is recovered, the net yield is 97.5%.

Instead of using propylene glycol in this example, other organic solvents at least partially miscible with water, and inert to other reagents employed in the preparation of the hydantoin may be employed. Such solvents include ethylene glycol, the mono ethyl ether of ethylene glycol, morpholine, dioxane, ethanolamine, ethyl acetate and the like. It will be clear that some solvents are more suitable than others and that the value of a particular solvent can be determined by simple trial.

The effect of variations in this preparation is illustrated by the following table:

| Expt. No. | Reactants | Solvent | Conditions | Gross yield | Net yield |
|---|---|---|---|---|---|
| | | | | Percent | |
| 1 | 9.1 g. benzophenone, 5.0 g. potassium cyanide, 15 g. ammonium carbonate. | 100 cc. propylene glycol | 110° C.; 11 hrs | 91.4 | |
| 2 | do | 100 cc. propylene glycol, 25 cc. water | 110° C.; 10.5 hrs | 95.3 | |
| 3 | do | 50 cc. propylene glycol, 5 cc. water | 110° C.; 5.5 hrs | 95.3 | |
| 4 | do | do | 110° C.; 4 hrs | 83.5 | |
| 5 | do | 100 cc. ethanolamine, 10 cc. water | 110° C.; 5 hrs | 24 | 45 |
| 6 | do | 100 cc. diethanolamine, 7 cc. water | 110° C.; 22 hrs | 31.8 | 63.2 |
| 7 | do | 100 cc. dioxane, 60 cc. water | 110° C.; 17.5 hrs | 32.6 | 72 |
| 8 | 9.1 g. benzophenone, 3.57 g. potassium cyanide, 9.6 g. ammonium carbonate. | 50 cc. propylene glycol, 4 cc. water | 110° C.; 4 hrs | 60.3 | |
| 9 | 91 g. benzophenone, 45 g. potassium cyanide, 145 g. ammonium carbonate. | 500 cc. propylene glycol, 50 cc. water | 110° C.; 6 hrs | 91.2 | 97.5 |
| 10 | 9.1 g. benzophenone, 4.5 g. potassium cyanide, 15 g. ammonium carbonate. | 80 cc. ethylene glycol | 110° C.; 10 hrs | 41.2 | |

*Example 10.—Preparation of 5,5-diphenylhydantoin using acetamide as a solvent*

100 grams of acetamide is melted in a steel bomb and to it is added 9.1 grams of benzophenone, 2.45 grams of sodium cyanide and 4.8 grams of ammonium carbonate. The bomb is closed and heated at 110° C. for 4 hours. Then, while still liquid, the contents of the bomb are dissolved in water and acidified. The precipitate is collected and leached with 5% sodium hydroxide solution to dissolve the diphenylhydantoin. The undissolved benzophenone is separated and the alkaline solution is acidified with acetic acid to precipitate the 5,5-diphenylhydantoin. The precipitate is collected, dried and recrystallized from methanol. Thus there is obtained an 83.5% gross yield of the hydantoin; since 1.2 grams of benzophenone is recovered, the net yield is 96%.

The following table summarizes the results of a number of experiments in which the conditions of reaction and the solvents are varied.

For example, I may employ any diaryl ketone containing in the aromatic nucleus no groups which are attacked by cyanides or ammonium carbonate or the combination of the two. Thus I may practice my invention on ring-halogenated diaryl ketones, on ring-amino substituted diaryl ketones, ring-alkylated diaryl ketones and the like. Such ketones include p-bromobenzophenone, p-aminobenzophenone, xenyl phenyl ketone, di-p-tolyl ketone, anisyl phenyl ketone, etc.

By organic solvents at least partially miscible with water, as employed in the practice of this invention, I mean solvents in which water is soluble at least to the extent of several per cent, although usually I prefer solvents completely miscible with water. Such solvents are in general relatively low molecular weight, alcohols, amines, esters, ethers and amides, and the solvents may contain functional groups corresponding to several of these classes of compounds. Suitable solvents are ethyl alcohol, methanol, n-propyl alcohol, ethyl acetate, dioxane, morpholine, pyridine, ethanolamine, diethanolamine, the isomeric propanolamines, the lower ethers of ethylene glycol such as the mono ethyl ether and the mono methyl ether, ethylene glycol, propylene glycol, acetamide, propionamide, glycerol and the like.

I find acetamide, aqueous propylene glycol, and aqueous alcohol to be particularly advantageous as solvents for the preparation of a great variety of diarylhydantoins. Often a few solvents give the highest yields for the preparation of a particular diarylhydantoin but this can readily be determined by a few trials.

Instead of using sodium cyanide or potassium cyanide in the practice of my invention, I may employ other water-soluble cyanides such as cal-

| Expt. No. | Reactants | Solvent | Conditions | Gross yield | Net yield |
|---|---|---|---|---|---|
| | | | | Percent | |
| 1 | 9.1 g. benzophenone, 4.5 g. potassium cyanide, 15.0 g. ammonium carbonate. | 100 cc. water | 110° C.; 14 hrs | 0 | |
| 2 | do | 115 g. acetamide, 20 cc. water | do | 91 | |
| 3 | do | do | 110° C.; 4 hrs | 33 | 93.5 |
| 4 | do | 115 g. acetamide | do | 95 | |
| 5 | do | 100 g. acetamide | 110° C.; 2 hrs | 44 | 95 |
| 6 | 9.1 g. benzophenone, 2.45 g. sodium cyanide, 4.8 g. ammonium carbonate. | do | 110° C.; 4 hrs | 83.5 | 96 |
| 7 | 9.1 g. benzophenone, 3.4 g. potassium cyanide, 4.8 g. ammonium carbonate. | do | do | 85 | |
| 8 | do | 50 g. acetamide | 110° C.; 6 hrs | 85 | |
| 9 | do | do | 110° C.; 4 hrs | 85 | |
| 10 | 18.2 g. benzophenone, 9.0 g. potassium cyanide, 28 g. ammonium carbonate. | 100 g. acetamide | 90° C.; 2 hrs | 5.1 | 79 |

Instead of using acetamine in this example, other lower aliphatic amides such as propionamide, butyramide and the like may also be employed.

In view of the foregoing examples it will be apparent that numerous variations can be employed in my process without departing from the spirit of my invention.

cium cyanide or lithium cyanide. However, I usually prefer to use alkali metal cyanides, because of their availability.

Instead of using ammonium carbonate in the practice of my invention, I may use other equivalent sources of carbon dioxide and ammonia. For example, ammonia gas and carbon dioxide gas may be pumped into the autoclave containing the mixture of the diaryl ketone, the organic solvent and the water-soluble cyanide, and the mixture heated and worked up to obtain the corresponding diarylhydantoin. Another source of ammonia and carbon dioxide is ammonium carbamate.

Where in the specification and claims the term ammonium carbonate is used, it is to be understood that it refers to the article of commerce designated by that name, which however is considered to be in reality a mixture of ammonium bicarbonate and ammonium carbamate. See further F. Ephraim Inorganic Chemistry (third ed. translated by P. C. L. Thorne and A. M. Ward, Nordeman Publishing Company, New York, 1939), page 801.

Since the invention may be practiced not only with ammonium carbonate, as above defined, but also with other equivalent sources of carbon dioxide and ammonia in the presence of water, I have used as a generic expression the phrase "reagent derived from the system $NH_3$—$CO_2$—Aq capable of regenerating all of these components under the conditions of reaction".

While the condensation of the diaryl ketone, the cyanide and ammonium carbonate proceeds in satisfactory yields when the mixture is heated in an open vessel at 50-65° C. for a long period of time, when higher temperatures are employed as for example from 65-150° C., there is a considerable loss of volatile reactants if an open vessel is employed. Accordingly, when operating in the range 65-150° C., I prefer to operate in a closed vessel.

Because of these permissible variations in my process, I do not wish my invention to be limited to a specific embodiment but desire rather that it be construed as broadly as possible in view of the prior art and the appended claims.

Some of the subject matter disclosed herein is claimed in my copending divisional applications Serial Nos. 535,211 and 535,212, both filed May 11, 1944.

What I claim as my invention is:

1. Process for the preparation of diarylhydantoins which comprises reacting substantially 1 mol of a diaryl ketone, substantially 1 mol of an alkali metal cyanide, and substantially 3 mols of ammonium carbonate, in aqueous alcohol at approximately 60° C. for more than 20 hours, while preventing the escape of volatile components, thereafter acidifying the mixture and isolating the diarylhydantoin thus produced.

2. Process for the preparation of 5,5-diphenylhydantoin which comprises reacting substantially 1 mol of benzophenone, substantially 1 mol of an alkali metal cyanide, and substantially 3 mols of ammonium carbonate, in aqueous alcohol at approximately 60° C. for more than 20 hours while preventing the escape of volatile components, thereafter acidifying the mixture and isolating the 5,5-diphenylhydantoin thus produced.

3. Diphenylene hydantoin of the formula:

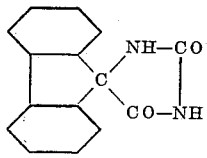

4. Process for the preparation of diphenylene hydantoin which comprises reacting fluorenone, a cyanide soluble in water, and a reagent derived from the system $NH_3$—$CO_2$—Aq capable of regenerating all of these components under the conditions of reaction, in the presence of an organic solvent at least partially miscible with water, acidifying the reaction mixture, and separating the diphenylene hydantoin thus produced.

5. In the process for the preparation of diphenylene hydantoin, the step which comprises heating together, at reaction temperature for a time permitting accumulation of appreciable reaction product, fluorenone, a cyanide soluble in water, and a reagent derived from the system $NH_3$—$CO_2$—Aq capable of regenerating all of these components under the conditions of reaction, in the presence of an organic solvent at least partially miscible with water.

6. Process for the preparation of diphenylene hydantoin which comprises reacting fluorenone in the presence of an alcohol at least partially miscible with water, with an alkali metal cyanide and ammonium carbonate at a temperature above 50° C. for a time permitting accumulation of an appreciable amount of diphenylene hydantoin, acidifying the reaction mixture and separating the diphenylene hydantoin thus produced.

7. Process for the preparation of diphenylene hydantoin which comprises reacting fluorenone in the presence of alcohol with an alkali metal cyanide and ammonium carbonate at a temperature between 50° C. and 150° C. for a time permitting accumulation of an appreciable amount of diphenylene hydantoin, acidifying the reaction mixture and separating the diphenylene hydantoin thus produced.

8. In the process for the preparation of diphenylene hydantoin, the step which comprises reacting fluorenone in the presence of alcohol with an alkali metal cyanide and ammonium carbonate at a temperature between 50° C. and 150° C. for a time permitting accumulation of an appreciable amount of diphenylene hydantoin in the reaction mixture.

9. Process for the preparation of a diarylhydantoin which comprises heating together in a closed system preventing loss of volatile reactants at temperatures above about 60° C., and for a time, at least a few hours, permitting accumulation of appreciable reaction product, a diaryl ketone, a water-soluble cyanide, and a reagent derived from the system $NH_3$—$CO_2$—Aq capable of regenerating all of these latter components under the conditions of the reaction, in the presence of an organic solvent inert to the reactants and at least partially miscible with water, acidifying the reaction mixture, and separating the diarylhydantoin thus produced.

10. Process for the preparation of a diarylhydantoin which comprises heating together in a closed system preventing loss of volatile reactants at temperatures above about 60° C., and for a time, at least a few hours, permitting accumulation of appreciable reaction product, a diaryl ketone, an alkali metal cyanide, and a reagent derived from the system $NH_3$—$CO_2$—Aq capable of regenerating all of these latter components under the conditions of the reaction, in the presence of aqueous alcohol, acidifying the reaction mixture, and separating the diarylhydantoin thus produced.

11. Process for the preparation of a diarylhydantoin which comprises heating together in a closed system preventing loss of volatile reactants at temperatures between 65° C. and 150° C., and for a time, at least four hours, permitting accumulation of appreciable reaction product, a diaryl ketone, a water-soluble cyanide, and a reagent derived from the system $NH_3$—$CO_2$—Aq capable of regenerating all of these latter components under the conditions of the reaction, in the presence of an organic solvent inert to the reactants and at least partially miscible with water, acidifying the reaction mixture, and separating the diarylhydantoin thus produced.

12. Process for the preparation of 5,5-diphenylhydantoin which comprises heating together in a closed system preventing loss of volatile reactants at temperatures above about 60° C., and for at least a few hours, benzophenone, a water-soluble cyanide, and a reagent derived from the system $NH_3$—$CO_2$—Aq capable of regenerating all of these latter components under the conditions of the reaction, in the presence of an organic solvent inert to the reactants and at least partially miscible with water, acidifying the reaction mixture, and separating the 5,5-diphenylhydantoin thus produced.

13. Process for the preparation of 5,5-diphenylhydantoin which comprises heating together in a closed system preventing loss of volatile reactants at temperatures above about 60° C., and for at least a few hours, benzophenone, an alkali metal cyanide, and a reagent derived from the system $NH_3$—$CO_2$—Aq capable of regenerating all of these latter components under the conditions of the reaction, in the presence of aqueous alcohol, acidifying the reaction mixture, and separating the 5,5-diphenylhydantoin thus produced.

14. In a process for the preparation of 5,5-diphenylhydantoin the step which comprises heating together in a closed system preventing loss of volatile reactants at temperatures between 65° and 150° C., and for at least four hours, benzophenone, a water-soluble cyanide, and a reagent derived from the system $NH_3$—$CO_2$—Aq capable of regenerating all of these latter components under the conditions of the reaction, in the presence of an organic solvent inert to the reactants and at least partially miscible with water, acidifying the reaction mixture and separating the 5,5-diphenylhydantoin thus produced.

HENRY R. HENZE.